(12) United States Patent
Moon et al.

(10) Patent No.: US 8,792,779 B2
(45) Date of Patent: Jul. 29, 2014

(54) METHOD OF SELECTING CONTENT REPRODUCING APPARATUS AND CONTENT REPRODUCING APPARATUS SELECTOR

(75) Inventors: Young-ho Moon, Suwon-si (KR); Kyung-sun Cho, Seoul (KR); Ik-hwan Cho, Seoul (KR); Mi-hwa Park, Anyang-si (KR); Woo-sung Shim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 554 days.

(21) Appl. No.: 12/576,562

(22) Filed: Oct. 9, 2009

(65) Prior Publication Data

US 2010/0124409 A1 May 20, 2010

(30) Foreign Application Priority Data

Nov. 14, 2008 (KR) ........................ 10-2008-0113349

(51) Int. Cl.
*H04N 5/93* (2006.01)
(52) U.S. Cl.
USPC .......................................................... 386/353
(58) Field of Classification Search
USPC .......................................................... 386/353
See application file for complete search history.

(56) References Cited

U.S. PATENT DOCUMENTS

| 6,670,966 B1* | 12/2003 | Kusanagi ....................... 715/723 |
| 2004/0230608 A1 | 11/2004 | Ornstein et al. | |
| 2006/0164931 A1* | 7/2006 | Kim et al. ..................... 369/30.3 |
| 2007/0016594 A1 | 1/2007 | Visharam et al. | |
| 2007/0022215 A1* | 1/2007 | Singer et al. .................. 709/246 |
| 2007/0130208 A1* | 6/2007 | Bornhoevd et al. ........ 707/104.1 |
| 2008/0065691 A1* | 3/2008 | Suitts et al. ................ 707/104.1 |
| 2009/0070384 A1* | 3/2009 | Seo .............................. 707/200 |
| 2010/0281179 A1* | 11/2010 | Istavan et al. ................. 709/231 |

FOREIGN PATENT DOCUMENTS

KR 1020070018541 A 2/2007

* cited by examiner

*Primary Examiner* — Thai Tran
*Assistant Examiner* — Jose Mesa
(74) *Attorney, Agent, or Firm* — Sughrue Mion, PLLC

(57) ABSTRACT

Provided are a method of selecting the most suitable content reproducing apparatus on the basis of minimum resource information required to reproduce content and capability information of the content reproducing apparatus, and a content reproducing apparatus selector using the method. The method includes: receiving a content file, which includes minimum resource (MR) metadata including the minimum resource information required to reproduce content, from a content providing server or a content providing medium; receiving device level (DL) metadata per device from a plurality of content reproducing apparatuses, wherein the DL metadata includes capability information of the content reproducing apparatus; determining whether at least one of the content reproducing apparatuses described by the DL metadata can reproduce the content described by the MR metadata; and selectively renewing the MR metadata on the basis of a result of the determining.

28 Claims, 7 Drawing Sheets

FIG. 2

| VALUE | CODEC NAME |
|---|---|
| 'mp4v' | MPEG-4 Visual |
| 'mp2v' | MPEG-4 Visual |
| 's283' | H.283 Video |
| 'avc1' | H.264/AVC Video |
| 'wmv1' | Window Media Video 7 |
| 'wmv2' | Window Media Video 8 |
| 'wmv3' | Window Media Video 9 |

| VALUE | CODEC NAME |
|---|---|
| 'mp4a' | MPEG-4 Audio (AAC) |
| 'm4ap' | High Efficient AAC (HE-AAC or AAC+) |
| 'mp3a' | MPEG-1 Layer 3 (MP3) |
| 'mp2a' | MPEG-2 Audio |
| 'samr' | AMR speech codec |
| 'sqcp' | Qualcomm QCELP codec |
| 'sevc' | EVRC speech codec |

METHOD OF SELECTING CONTENT REPRODUCING APPARATUS AND CONTENT REPRODUCING APPARATUS SELECTOR

CROSS-REFERENCE TO RELATED PATENT APPLICATION

This application claims the benefit of Korean Patent Application No. 10-2008-0113349, filed on Nov. 14, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to selecting a content reproducing apparatus, and more particularly, to a method of selecting the most suitable content reproducing apparatus on the basis of minimum resource information required to reproduce content and capability information of the content reproducing apparatus, and a content reproducing apparatus selector using the method.

2. Description of the Related Art

As digital multimedia technology has developed, users' needs for reproducing content files based on various multimedia standards in various types of user terminals have increased.

Conventionally, a content file is a single file format, and the content file describes content based on a single standard. A user must determine whether he or she can normally reproduce the content file in a specific user terminal in consideration of a reproduction capability, a storage capability, etc. of the user terminal.

For example, a user must previously determine information considering that a user terminal not having a motion picture expert group 2-transport stream (MPEG2-TS) demultiplexer cannot reproduce a content file having an MPEG2-TS format. Also, when a user terminal cannot reproduce a content file, a user must convert (that is, transcode) the content file into a specific media format that is compatible with the user terminal, or must determine whether to reproduce content by using a content file having a different format.

SUMMARY OF THE INVENTION

Exemplary embodiments of the present invention provide a method of selecting the most suitable content reproducing apparatus on the basis of minimum resource information required to reproduce content and capability information of the content reproducing apparatus, and a content reproducing apparatus selector using the method.

According to an aspect of the present invention, there is provided a method of selecting a content reproducing apparatus, the method including: receiving a content file, which includes minimum resource (MR) metadata including minimum resource information required to reproduce content, from a content providing server or a content providing medium; receiving device level (DL) metadata per device from a plurality of content reproducing apparatuses, wherein the DL metadata includes capability information of the content reproducing apparatus; determining whether at least one of the content reproducing apparatuses described by the DL metadata can reproduce the content described by the MR metadata; and selectively renewing the MR metadata on the basis of a result of the determining.

The content file may be a multi-track content file including a plurality of different codec-based audio tracks and video tracks, and the content file further includes content information metadata including information about content, information about each audio track and video track, and mapping information for pairing the audio track and the video track.

The MR metadata may include minimum resource information regarding a default pair including an audio track and a video track.

The selective renewing of the MR metadata may include, when a content reproducing apparatus capable of reproducing the content described by the MR metadata does not exist, renewing the MR metadata with minimum resource information regarding another pair including an audio track and a video track.

The method may further include, when at least one of the content reproducing apparatuses described by the DL metadata can reproduce the content described by the MR metadata, controlling the most suitable content reproducing apparatus described by the DL metadata including the most appropriate capability information to reproduce the content.

The MR metadata may include specification information of at least one of a CPU, a memory, a display, a sound, and a decoder which are required to reproduce the content.

The DL metadata may include network connection information of a device, content profile information which can be supported by the device, and device resource information of at least one of a memory, a display, and a hard disk.

The content information metadata may include a pair ID regarding an audio track and video track pair, paired video track ID and audio track ID, and paired video codec information of the video track and audio codec information of the audio track.

The content file, the MR metadata, the DL metadata, and the content information metadata may be described in an ISO-based file format.

The type of the track may be expanded to include other multimedia data.

According to another aspect of the present invention, there is provided a method of reproducing content, the method including: receiving a multi-track content file comprising a plurality of different codec-based audio tracks and video tracks, from a content providing server or a content providing medium; selecting a pair including the audio track and the video track from among a plurality of pairs each including the audio track and the video track, on the basis of a specification of a content reproducing apparatus; and reproducing the content file by using the audio track and the video track which correspond to the selected pair.

According to another aspect of the present invention, there is provided a computer readable recording medium having embodied thereon a computer program for executing the method.

According to another aspect of the present invention, there is provided a content reproducing apparatus selector including: a content file receiving unit receiving a content file including MR metadata, which includes minimum resource information required to reproduce content, from a content providing server or a content providing medium; a device information receiving unit receiving DL metadata per device from a plurality of content reproducing apparatuses, wherein the DL metadata includes capability information of the content reproducing apparatus; a determining unit determining whether at least one of the content reproducing apparatuses described by the DL metadata can reproduce the content described by the MR metadata; and a renewing unit selectively renewing the MR metadata on the basis of a result of the determination.

According to another aspect of the present invention, there is provided content reproducing apparatus including: a content file receiving unit receiving a multi-track content file, which includes a plurality of different codec-based audio tracks and video tracks, from a content providing server or a content providing medium; a selecting unit selectively selecting a pair including the audio track and the video track from among the plurality of pairs each including the audio track and the video track, on the basis of a specification of the content reproducing apparatus; and a reproducing unit reproducing the content file by using the audio track and the video track which correspond to the selected pair.

BRIEF DESCRIPTION OF THE DRAWINGS

The above and other features of the present invention will become more apparent by describing in detail exemplary embodiments thereof with reference to the attached drawings in which:

FIG. 2 illustrates a type of codec based on various multimedia standards according to an embodiment of the present invention;

DETAILED DESCRIPTION OF THE INVENTION

Figure 1:
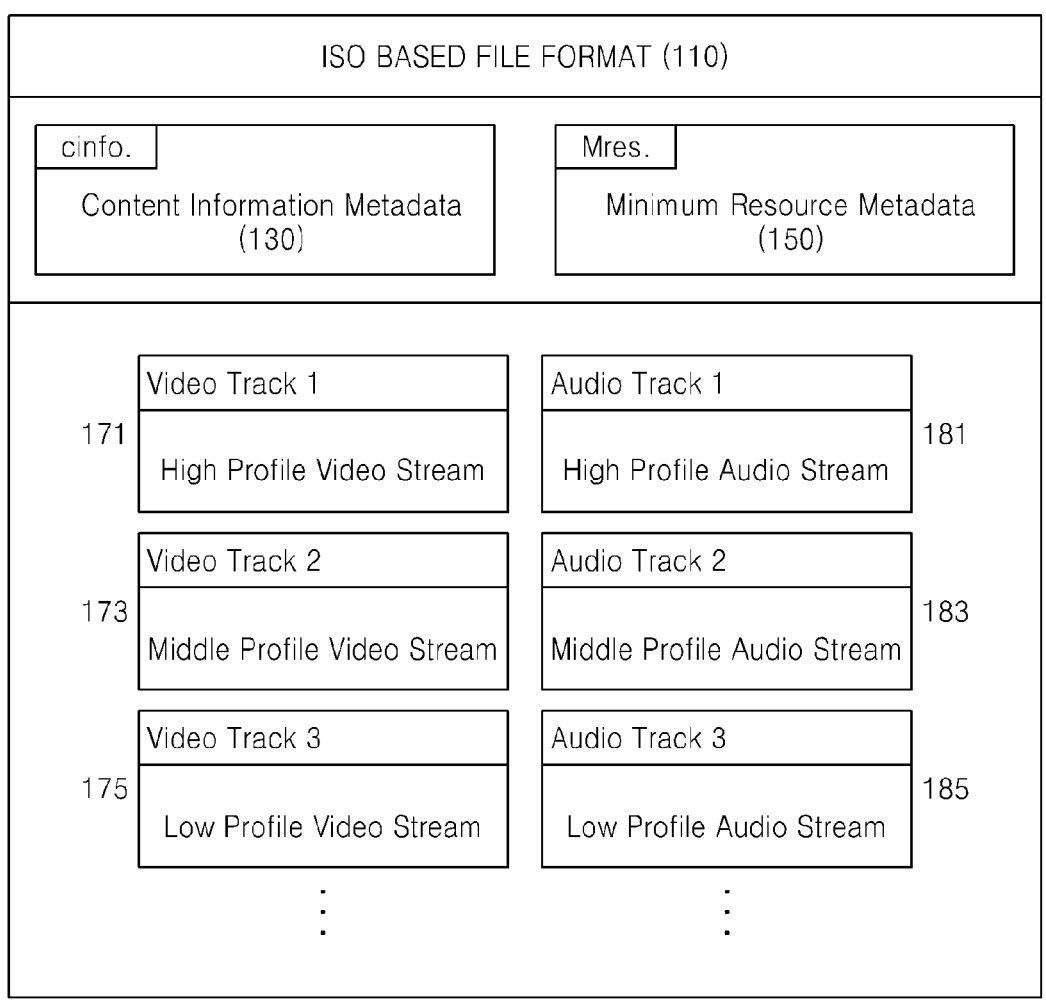
FIG. 1 illustrates a content file described in an ISO-based file format according to an embodiment of the present invention.

Hereinafter, the present invention will be described in detail by explaining exemplary embodiments of the invention with reference to the attached drawings. The same reference numerals in the drawings denote the same element. In the drawings, the thicknesses of layers and regions are exaggerated for clarity.

FIG. 1 illustrates a content file in an ISO-based file format 110 according to an exemplary embodiment of the present invention.

The content file includes content information metadata 130, minimum resource (MR) metadata 150, and a plurality of different codec-based video tracks 171, 173, and 175 and audio tracks 181, 183, and 185. Each track logically constitutes one audio file or one video file and is described through a value indicative of a separate codec of various multimedia standards, as illustrated in FIG. 2.

The content information metadata 130 includes information about content, information about each audio track and video track, and mapping information for pairing the audio tracks and the video tracks.

The information about content may include "creation_time" representing the time the content is generated, "duration" representing the time the content is reproduced, "author" representing a content author, "title" representing a content title, "broadcaster" representing a broadcasting station broadcasting the content, "rating_score" representing a grade regarding the audience's satisfaction, and "content_genre" representing a content genre such as a drama, news, or the like.

The content information metadata 130 includes "pair_ID" for pairing an audio track and a video track, and includes "video_track_ID" and "audio_track_ID" corresponding to each "pair_ID".

The content information metadata 130 includes "video_codec"/"audio_codec", "video_frame_rate"/"audio_sample_rate", "video_bitrate"/"audio_bitrate", "video_resolution" and "audio_channel_number", which corresponds to each "video_track_ID" and "audio_track_ID".

The "video_codec" and the "audio_codec" are any of a plurality of codecs illustrated in FIG. 2. The "video_frame_rate" represents the average frame rate of a video stream, and a frame rate represents the number of frames reproduced per second. The "audio_sample_rate" represents the number of samples per second of an audio stream. The "video_bitrate" represents the average bitrate of a video stream, and the "audio_bitrate" represents the average bitrate of an audio stream. The "video_resolution" represents a resolution of a video track stream corresponding to the "video_track_ID", and is represented as a [width][height] value. The "audio_channel_number" represents the number of channels of an audio track stream corresponding to the "audio_track_ID".

In the current embodiment, a plurality of audio and video track pairs 310 and 330 may be formed (hereinafter referred to as "pairs"), and the content information metadata 130 may include the "pair_ID", corresponding to a default pair, from among many pairs.

The MR metadata 150 includes minimum resource information required to reproduce content, and may include specification information, for example, information regarding a central processing unit (CPU), a memory, a display, a sound, a decoder, etc., required to reproduce content.

Figure 3:
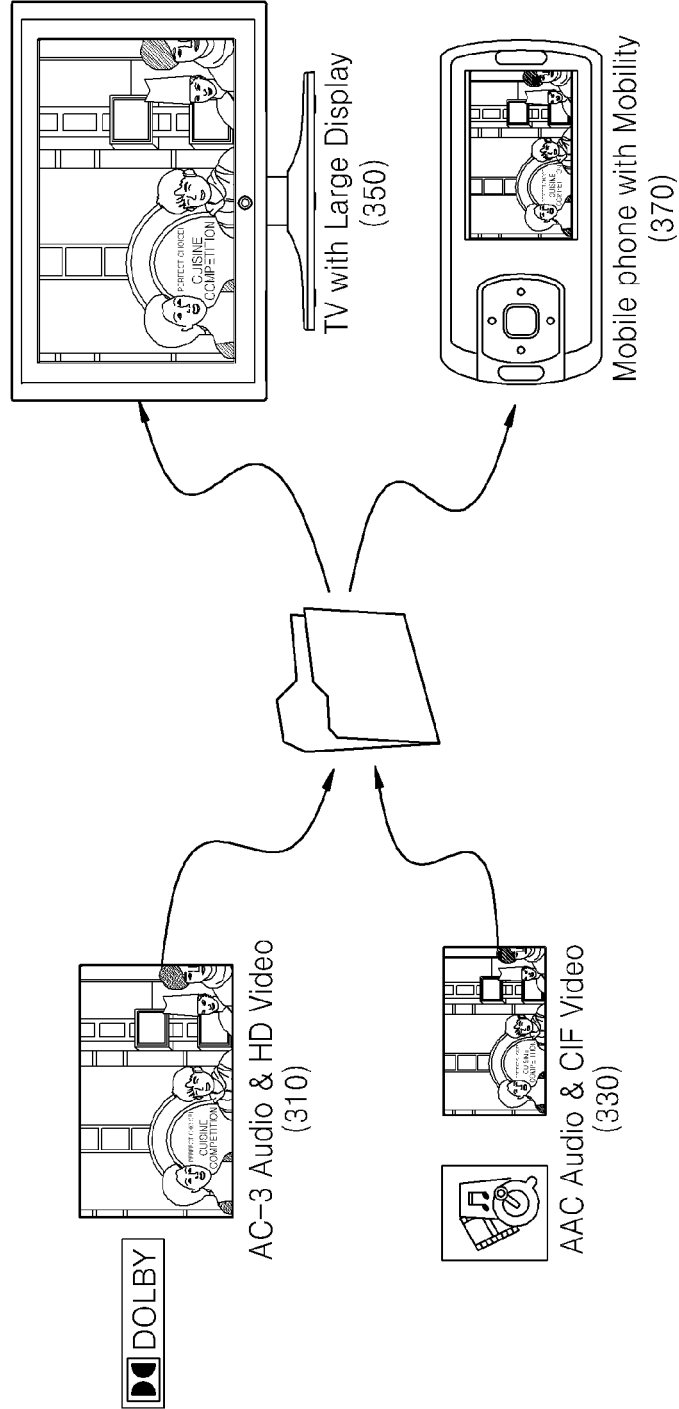
FIG. 3 illustrates an example in which content comprised of a plurality of audio and video track pairs is reproduced in content reproducing apparatuses each having a different specification, according to an embodiment of the present invention.

FIG. 3 illustrates an example in which content, comprised of a plurality of pairs each including an audio track and a video track, is reproduced in content reproducing apparatuses 350 and 370 each having a different specification, according to an embodiment of the present invention.

According to the current embodiment, as the content includes various codec-based multi-track content files, the content reproducing apparatuses 350 and 370 can reproduce the content without performing separate transcoding processes by pairing the audio track and the video track according to the specification of the content reproducing apparatuses 350 and 370.

Figure 4:
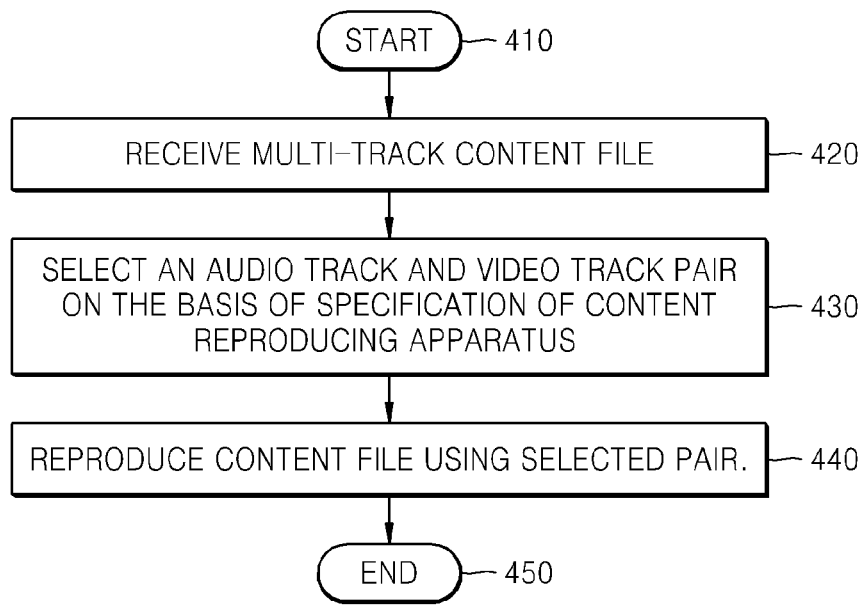
FIG. 4 is a flowchart of a process for reproducing a multi-track content file according to an embodiment of the present invention.

FIG. 4 is a flowchart of a process for reproducing a multi-track content file according to an embodiment of the present invention.

In operation 420, a content reproducing apparatus 500 receives a multi-track content file, which includes a plurality of different codec-based audio tracks and video tracks, from a content providing server or a content providing medium.

The multi-track content file includes information about content, information about each audio track and video track, and mapping information for pairing the audio track and the video track, as content information metadata.

In detail, the content information metadata includes a pair ID regarding an audio track and video track pair, paired video track and audio track IDs, and paired video codec information of the video track and audio codec information of the audio track.

In operation 430, the content reproducing apparatus 500 selects an audio track and video track pair from among a plurality of pairs each including an audio track and a video track, on the basis of the specification of the content reproducing apparatus 500.

In operation 440, the content reproducing apparatus 500 reproduces a content file using the audio track and the video track, which correspond to the selected pair.

Figure 5:
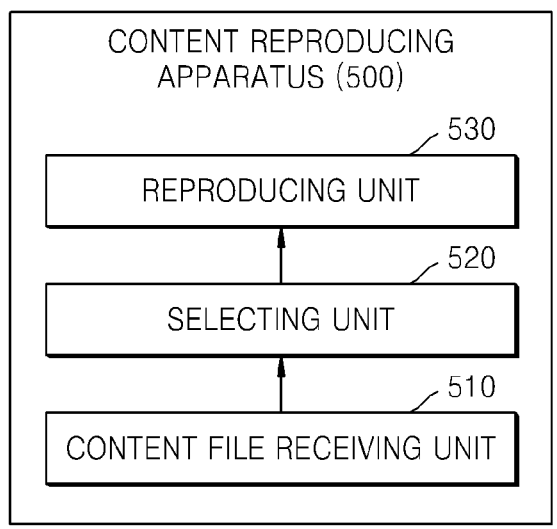
FIG. 5 is a block diagram of a structure of a content reproducing apparatus according to an embodiment of the present invention.

FIG. 5 is a block diagram of a structure of the content reproducing apparatus 500 according to an embodiment of the present invention.

The content reproducing apparatus 500 includes a content file receiving unit 510, a selecting unit 520 and a reproducing unit 530.

The content file receiving unit 510 receives a multi-track content file, which includes a plurality of different codec-based audio tracks and video tracks, from a content providing server or a content providing medium.

The selecting unit 520 selects an audio track and video track pair from among a plurality of pairs each including an audio track and a video track, on the basis of the specification of the content reproducing apparatus 500.

The reproducing unit 530 reproduces a content file using the audio track and the video track, which correspond to the selected pair.

Figure 6:
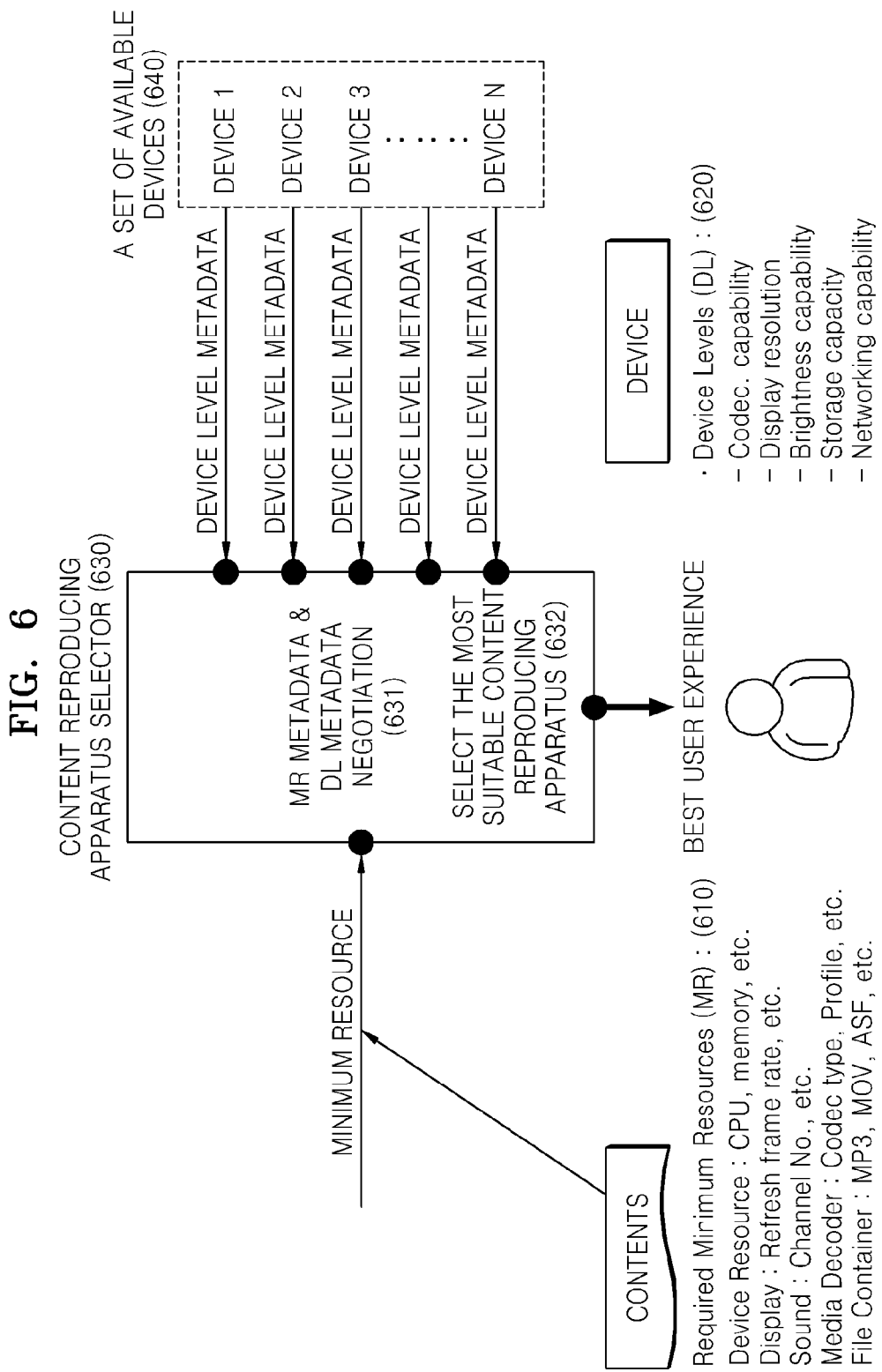
FIG. 6 is a schematic view of a service for selecting the most suitable content reproducing apparatus according to another embodiment of the present invention.

FIG. 6 is a schematic view of a service for selecting the most suitable content reproducing apparatus according to another embodiment of the present invention;

As described in FIG. 6, MR metadata 610 is generated for each item of content, and includes minimum resource information required to reproduce the content. Device level (DL) metadata 620 is generated in each apparatus, and includes capability information of software and hardware of the content reproducing apparatus.

A content reproducing apparatus selector 630 according to the current embodiment obtains minimum resource information required for content through the MR metadata 610, and obtains capability information of software and hardware of a plurality of content reproducing apparatuses through the DL metadata 620. When at least one of the content reproducing apparatuses described by the DL metadata 620 can reproduce content described by the MR metadata 610, the content reproducing apparatus selector 630 controls the most suitable content reproducing apparatus, which is described by the DL metadata 620 including the most appropriate capability information, to reproduce content by associating the MR metadata 610 and the DL metadata 620 appropriately.

According to the current embodiment, without the need for a user to determine whether it is possible to reproduce particular content in the content reproducing apparatus, the content reproducing apparatus selector 630 can control selection of the most suitable content reproducing apparatus on the basis of minimum resource information required for the content.

Figure 7:
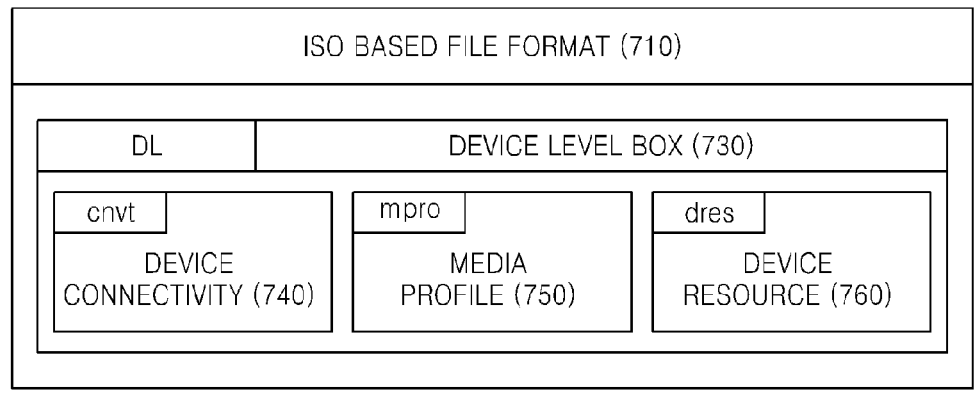
FIG. 7 illustrates a structure of device level (DL) metadata in an ISO-based file format according to another embodiment of the present invention.

FIG. 7 illustrates a structure of DL metadata 730 in an ISO-based file format 710 according to another embodiment of the present invention.

The DL metadata 730 includes a device connectivity box 740 including network connection information of a device, a media profile box 750 including content profile information that can be supported by the device, and a device resource box 760 including device resource information such as information regarding a display, a hard disk, etc.

The device connectivity box 740 may include information such as "entry_num", "connectivity_ID", "priority", "description", etc.

The "entry_num" represents the total number of network connection technologies which can be used in the device. In a device not having connectivity with other devices, the value of the "entry_num" is 0.

The "connectivity_ID" represents an encoding value regarding the network connection technology supported by the device. For example, the network connection technology may be IEEE 802.3i, IEEE 802.3U, IEEE 802.3ab, USB, IEEE 1394, IEEE 802.11a, IEEE 802.11b, IEEE 802.11g, IEEE 802.16e, Bluetooth, or the like, and each network connection technology thereof has its own encoding value.

The "priority" represents the priority order regarding each network connection technology supported by the device, in consideration of frequency of use, stability, and importance. The "description" represents a description regarding the network connection technology supported by the device.

The media profile box 750 may include information such as "profile_ID", "description", "mime_type", "level", etc.

The "profile_ID" represents profile ID information of the content which can be supported by the device. Each "profile_ID" is based on a "DLNA Networked Device Interoperability Guidelines, Volume 2: Media Format Profiles" standard, and thus a detailed description thereof will be omitted here.

The "description" represents an additional description regarding a characteristic and usage of each "profile_ID".

The "mime_type" corresponds to each "profile_ID", and a plurality of "mime_types" may be assigned to one "profile_ID".

The "level" represents identification information representing characteristic information of the "profile_ID", for example, "HD", "SD", "2ch", etc.

The device resource box 760 may include information such as "memory", "display_size", "display_type", "resolution", "hdd_size", "manufacturer", "model_number", "peripheral", etc.

The "memory" represents the size of the memory installed in the device, and the unit of the "memory" is a kilobyte.

The "display_size" represents the size of the display included in the device, and the unit of the "display_size" is an inch.

The "display_type" represents the type of the display included in the device such as a liquid crystal display (LCD), a plasma display panel (PDP), and a cathode-ray tube (CRT).

The "resolution" represents information of a resolution which can be expressed in the device. The "resolution" is expressed as horizontal information and vertical information, and the unit of the "resolution" is a pixel.

The "hdd_size" represents the entire capacity of a hard disk of the device, and the unit of the "hdd_size" is a megabyte.

The "manufacturer" represents a manufacturer of the device.

The "model_number" represents a serial number of the device assigned by the manufacturer.

The "peripheral" represents a peripheral device which can be connected with the device.

Figure 8:
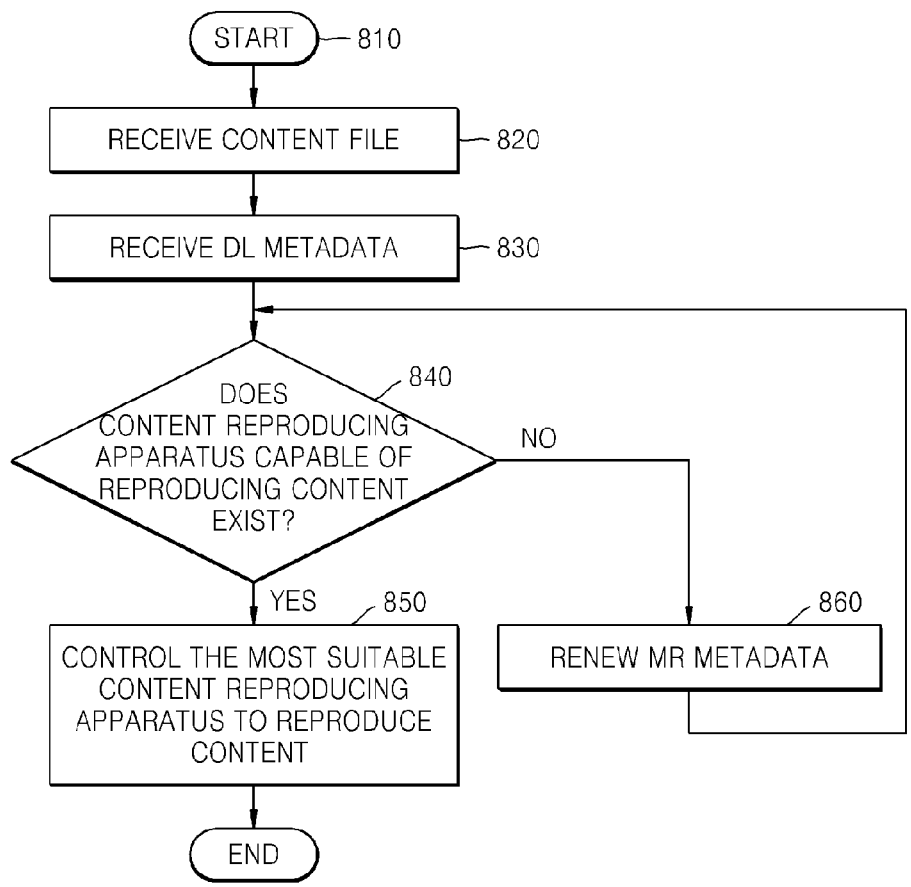
FIG. 8 is a flowchart of a process for selecting a content reproducing apparatus according to another embodiment of the present invention.

FIG. 8 is a flowchart of a process for selecting a content reproducing apparatus according to another embodiment of the present invention.

In operation 820, the content reproducing apparatus selector 630 receives a content file including MR metadata, which includes minimum resource information required to reproduce content, from a content providing server or a content providing medium.

In operation 830, the content reproducing apparatus selector 630 receives DL metadata per device from a plurality of content reproducing apparatuses, wherein the DL metadata includes capability information of the content reproducing apparatus.

In operation 840, the content reproducing apparatus selector 630 determines whether at least one of the content reproducing apparatuses described by the DL metadata can reproduce the content described by the MR metadata. If at least one of the content reproducing apparatuses described by the DL metadata can reproduce the content described by the MR metadata, the process proceeds to operation 850, and if not, the process proceeds to operation 860.

Operation 850 represents a case where at least one of the content reproducing apparatuses described by the DL metadata can reproduce the content described by the MR metadata, and the content reproducing apparatus selector 630 controls the most suitable content reproducing apparatus described by the DL metadata including the most appropriate capability information to reproduce the content.

Operation 860 represents a case where the content reproducing apparatus capable of reproducing the content described by the MR metadata does not exist, and the content reproducing apparatus selector 630 renews the MR metadata with minimum resource information regarding another pair including an audio track and a video track.

Figure 9:
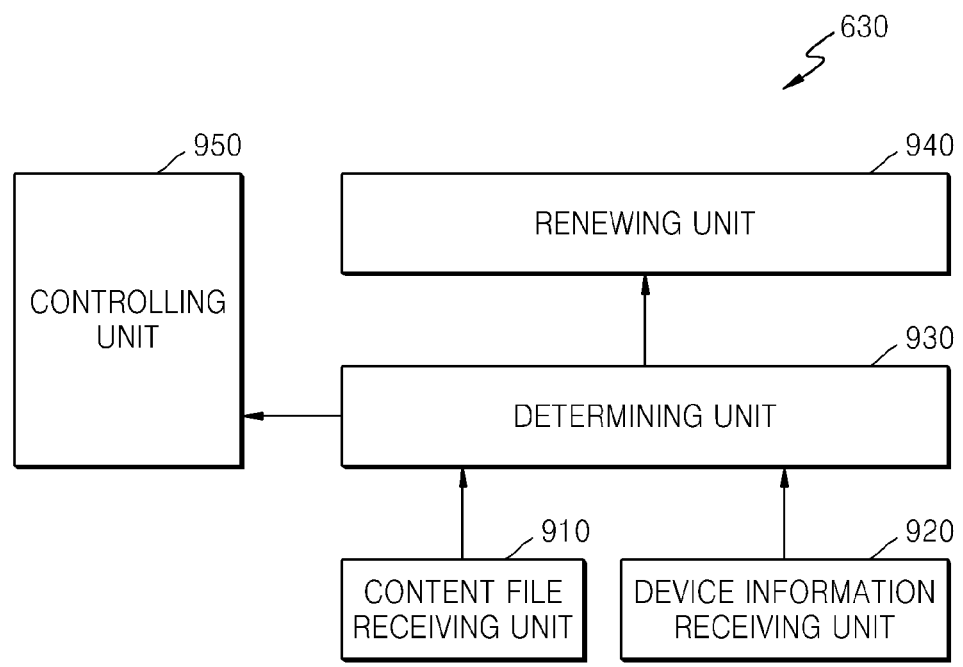
FIG. 9 is a block diagram of a structure of a content reproducing apparatus selector according to another embodiment of the present invention.

FIG. 9 is a block diagram of a structure of a content reproducing apparatus selector 630 according to another embodiment of the present invention.

The content reproducing apparatus selector 630 includes a content file receiving unit 910, a device information receiving unit 920, a determining unit 930, a renewing unit 940, and a controlling unit 950.

The content file receiving unit 910 receives a content file, which includes MR metadata including minimum resource information required to reproduce content, from a content providing server or a content providing medium.

The device information receiving unit 920 receives DL metadata per device from a plurality of content reproducing apparatuses, wherein the DL metadata includes capability information of a content reproducing apparatus.

The determining unit 930 determines whether at least one of the content reproducing apparatuses described by the DL metadata can reproduce the content described by the MR metadata.

When the content reproducing apparatus capable of reproducing the content described by the MR metadata, does not exist, the renewing unit 940 renews the MR metadata with minimum resource information regarding another pair including an audio track and a video track.

When at least one of the content reproducing apparatuses described by the DL metadata can reproduce the content described by the MR metadata, the controlling unit 950 controls the most suitable content reproducing apparatus described by the DL metadata including the most appropriate capability information to reproduce the content.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of selecting a content reproducing apparatus of a plurality of content reproducing apparatuses, the method comprising: receiving a content file comprising a content and minimum resource (MR) metadata, from a content providing server or a content providing medium, the content comprising a plurality of audio tracks and a plurality of video tracks and the MR metadata comprising minimum resource information required to reproduce a first pair of one of the plurality of audio tracks and one of the plurality of video tracks; receiving device level (DL) metadata from the plurality of content reproducing apparatuses, wherein the DL metadata comprise capability information of the plurality of content reproducing apparatuses; determining whether at least one of the plurality of content reproducing apparatuses is operable to reproduce the content; and renewing the MR metadata to comprise minimum resource information required to reproduce a second pair of one of the plurality of audio tracks and one of the plurality of video tracks when none of the plurality of content reproducing apparatuses is operable to reproduce the content and re-determining whether at least one of the plurality of content reproducing apparatuses is operable to reproduce the content.

2. The method of claim 1, wherein the content file is a multi-track content file and the content file further comprises content information metadata comprising information about the content, information about the plurality of audio tracks and the plurality of video tracks, and mapping information for pairing each of the plurality of audio tracks to corresponding one of the plurality of video tracks,
    wherein the plurality of audio tracks are in different audio formats, each of the plurality of audio tracks being generated by transcoding from a same audio track, and the plurality of video tracks containing a same video source are in different video formats, each of the plurality of audio tracks being generated by transcoding from a same video track.

3. The method of claim 1, wherein the MR metadata comprises minimum resource information regarding a default pair comprising one of the plurality of the audio tracks and one of the plurality of video tracks.

4. The method of claim 1, further comprising, when the at least one of the content reproducing apparatuses is operable to reproduce the content, controlling one of the at least one of the content reproducing apparatuses to reproduce the content.

5. The method of claim 1, wherein the MR metadata comprises information of at least one of a CPU, a memory, a display, a sound, and a decoder for reproducing the content.

6. The method of claim 1, wherein one of the DL metadata comprises network connection information of a device, content profile information supported by the device, and device resource information of at least one of a memory, a display, and a hard disk.

7. The method of claim 2, wherein the content information metadata comprises a pair ID regarding an audio track and a video track pair, paired video track ID and audio track ID, and paired video codec information of the video track and audio codec information of the audio track.

8. The method of claim 2, wherein the content file, the MR metadata, the DL metadata, and the content information metadata are in an ISO-based file format.

9. The method of claim 2, wherein the content further comprises other tracks.

10. A method of reproducing content, the method comprising: receiving a multi-track content file, the multi-track content file comprising minimum resource (MR) metadata, a plurality of audio tracks and a plurality of video tracks, from a content providing server or a content providing medium, wherein the plurality of audio tracks are in different audio formats, each of the plurality of audio tracks being generated by transcoding from a same audio track, and the plurality of video tracks containing a same video source are in different video formats, each of the plurality of video tracks being generated by transcoding from a same video track; selecting a pair, the pair comprising one of the plurality of audio tracks and one of the plurality of video tracks, from among a plurality of pairs, based on a specification of a content reproducing apparatus; reproducing the multi-track content file by using the one of the plurality of audio tracks and the one of the plurality of video tracks which correspond to the selected pair; and renewing the MR metadata to comprise minimum resource information required to reproduce a second pair of one of the plurality of audio tracks and one of the plurality of video tracks when content reproducing apparatuses are not operable to reproduce the content file and re-determining whether content reproducing apparatuses are operable to reproduce the content.

11. The method of claim 10, wherein the multi-track content file further comprises content information metadata, the content information metadata comprises information regarding content, information regarding the plurality of audio tracks and the plurality of video tracks, and mapping information for pairing each of the plurality of audio tracks to corresponding one of the plurality of video tracks.

12. The method of claim 11, wherein the content information metadata further comprises a pair ID regarding an audio track and a video track pair, paired video track ID and audio track ID, and paired video codec information of the video track and audio codec information of the audio track.

13. The method of claim 10, wherein the multi-track content file is in an ISO-based file format.

14. A content reproducing apparatus selector comprising: a content file receiving unit which receives a content file comprising a content and minimum resource (MR) metadata, from a content providing server or a content providing medium, the content comprising a plurality of audio tracks and a plurality of video tracks and the MR metadata comprising minimum resource information required to reproduce a first pair of one of the plurality of audio tracks and one of the plurality of video tracks; a device information receiving unit which receives device level (DL) metadata from a plurality of content reproducing apparatuses, the DL metadata comprising capability information of the plurality of content reproducing apparatuses; a determining unit which determines in a determination, whether at least one of the content reproducing apparatuses is operable to reproduce the content by comparing the MR metadata with the DL metadata; and a renewing unit which renews the MR metadata to comprise minimum resource information required to reproduce a second pair of one of the plurality of audio tracks and one of the plurality of video tracks, when none of the plurality of content reproducing apparatuses is operable to reproduce the content and re-determines whether at least one of the plurality of content reproducing apparatuses is operable to reproduce the content.

15. The content reproducing apparatus selector of claim 14, wherein the content file is a multi-track content file and the content file further comprises information regarding the content, information regarding the plurality of audio tracks and the plurality of video tracks, and mapping information for pairing each of the plurality of audio tracks to corresponding one of the plurality of video tracks,
wherein the plurality of audio tracks are in different audio formats, each of the plurality of audio tracks being generated by transcoding from a same audio track, and the plurality of video tracks containing a same video source are in different video formats, each of the plurality of audio tracks being generated by transcoding from a same video track.

16. The content reproducing apparatus selector of claim 14, wherein the MR metadata comprises minimum resource information regarding a default pair comprising one of the plurality of the audio tracks and one of the plurality of video tracks.

17. The content reproducing apparatus selector of claim 14, further comprising a controlling unit which controls one of the at least one of the plurality of content reproducing apparatuses, when the at least one of the content reproducing apparatuses is operable to reproduce the content.

18. The content reproducing apparatus selector of claim 14, wherein the MR metadata comprises information of at least one of a CPU, a memory, a display, a sound, and a decoder for reproducing the content.

19. The content reproducing apparatus selector of claim 14, wherein one of the DL metadata comprises network connection information of the device, content profile information supported by the device, and device resource information of at least one of a memory, a display, and a hard disk.

20. The content reproducing apparatus selector of claim 15, wherein the content information metadata comprises a pair ID regarding an audio track and a video track pair, paired video track ID and audio track ID, and paired video codec information of the video track and audio codec information of the audio track.

21. The content reproducing apparatus selector of claim 15, wherein the content file, the MR metadata, the DL metadata, and the content information metadata are in an ISO-based file format.

22. The content reproducing apparatus selector of claim 15, wherein the content further comprises other tracks.

23. A content reproducing apparatus comprising: a content file receiving unit which receives a multi-track content file, which comprises minimum resource (MR) metadata, a plurality of audio tracks and a plurality of video tracks, from a content providing server or a content providing medium, wherein the plurality of audio tracks are in different audio formats, each of the plurality of audio tracks being generated by transcoding from a same audio track, and the plurality of video tracks containing a same video source in different video formats, each of the plurality of video tracks being generated by transcoding from a same video track; a selecting unit which selectively selects a pair, the pair comprising one of the plurality of audio tracks and one of the plurality of video tracks, from among the plurality of pairs, based on a specification of the content reproducing apparatus; a reproducing unit which reproduces the content file by using the one of the plurality of audio tracks and the one of the plurality of video tracks which correspond to the selected pair; and a renewing unit which renews the MR metadata to comprise minimum resource information required to reproduce a second pair of one of the plurality of audio tracks and one of the plurality of video tracks, when content reproducing apparatuses are not operable to reproduce the content file and re-determining whether content reproducing apparatuses are operable to reproduce the content.

24. The content reproducing apparatus of claim 23, wherein the multi-track content file further comprises content information metadata, the content information metadata comprises information regarding content, information regarding the plurality of audio tracks and the plurality of video tracks, and mapping information for pairing each of the plurality of audio tracks to corresponding one of the plurality of video tracks.

25. The content reproducing apparatus of claim 24, wherein the content information metadata further comprises a pair ID regarding an audio track and a video track pair, paired video track ID and audio track ID, and paired video codec information of the video track and audio codec information of the audio track.

26. The content reproducing apparatus of claim 23, wherein the multi-track content file is in an ISO-based file format.

27. A non-transitory computer readable recording medium having embodied thereon a computer program for executing the method of claim 1.

28. A non-transitory computer readable recording medium having embodied thereon a computer program for executing the method of claim 10.

* * * * *